March 3, 1936.  E. A. RAITHEL  2,033,007
DEVICE FOR HOLDING FISHING RODS
Filed July 1, 1935
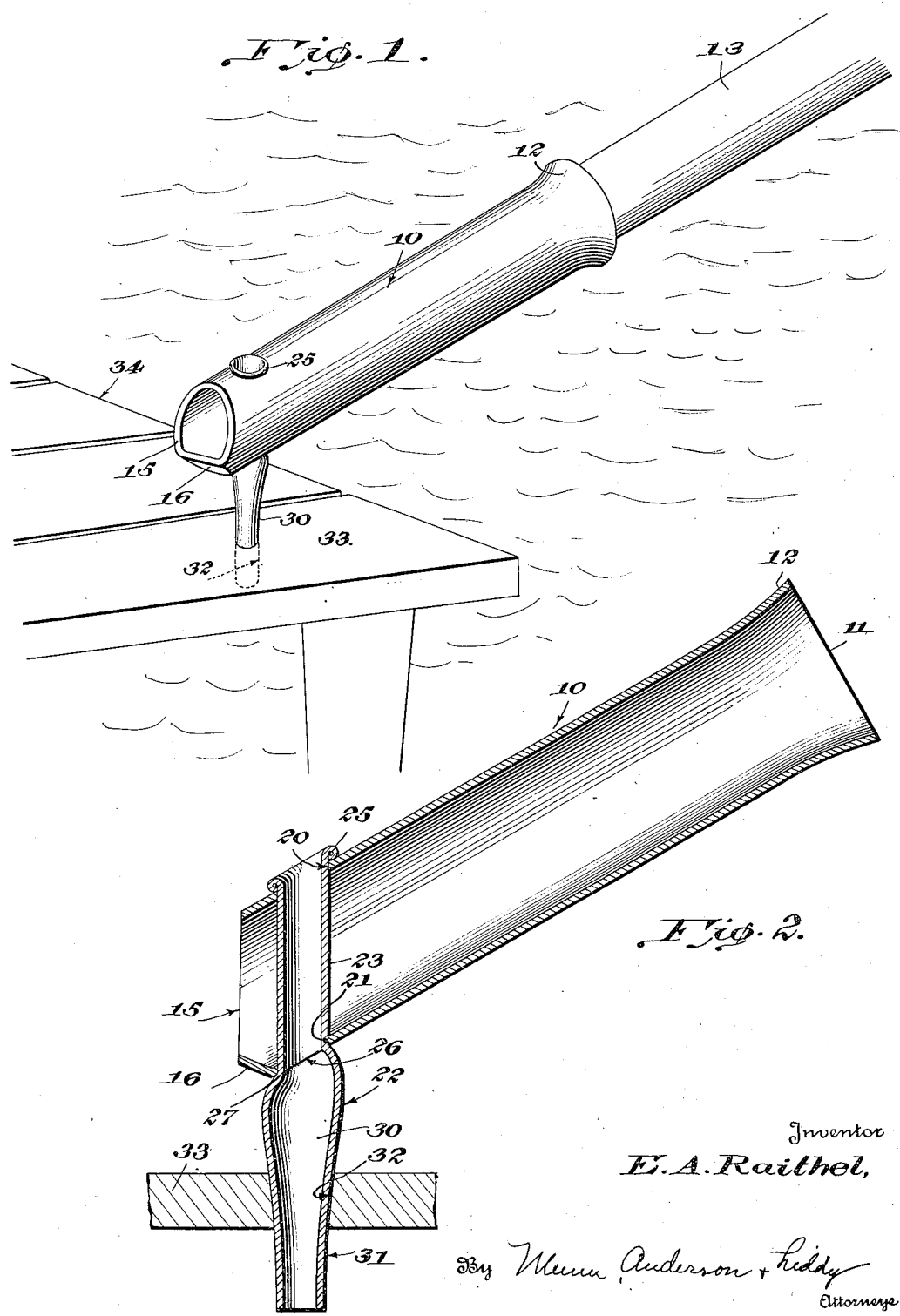
Inventor
E. A. Raithel,
By Munn, Anderson + Liddy
Attorneys Patented Mar. 3, 1936

2,033,007

UNITED STATES PATENT OFFICE 2,033,007

DEVICE FOR HOLDING FISHING RODS

Ed A. Raithel, Jefferson City, Mo.

Application July 1, 1935, Serial No. 29,324

1 Claim. (Cl. 248—42)

This invention relates to a device for holding fishing rods.

An object of the invention is the provision of a device for supporting a fishing rod from a fixed support whereby the device may be revolved for aligning the rod with the line depending therefrom.

Another object of the invention is the provision of a barrel supported at an angle to the horizontal which is adapted to receive the inner end of a fishing rod, means being provided for supporting the barrel in an opening in a fixed support which may be either a wharf or one of the openings normally adapted to receive the oar lock of a boat.

A further object of the invention is the provision of a holder for fishing poles in which a barrel adapted to receive the inner end of a fishing rod is mounted at an angle to the horizontal on a fixed support, the mounting consisting of a hollow pin having a reduced portion passing through a passage located at an angle to a diameter cutting said passage, said pin having shoulders upon opposite ends of the passage for rigidly securing the pin to the barrel, the projecting portion of the pin being tapered for insertion in an opening in a support whereby the barrel may be revolved on the support.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Figure 1 is a view in perspective of a holder constructed in accordance with the principles of my invention, and Figure 2 is a vertical section of the same.

Referring more particularly to the drawing, 10 designates a hollow barrel which is formed of metal. This barrel has an open end, as shown at 11, and the metal at said opening is flared at 12 to facilitate the insertion of the inner end of a fishing rod 13.

The opposite end of the barrel, as shown at 15, is open but is reduced in cross sectional area by flattening the bottom portion, as shown at 16. The opening 15 is located at an acute angle to a diameter of the barrel which cuts the plane of the opening.

The barrel 10 is provided adjacent the last-mentioned end with a transverse passage providing openings 20 and 21 at opposite points in the barrel and this passage is substantially parallel to the opening 15 and is therefore located at an acute angle to a diameter cutting the passage.

A pin, generally designated by the numeral 22, has a reduced cylindrical portion 23 received by the openings 20 and 21 at the opposite ends of the transverse passage of the barrel. The outer upper end of the hollow pin is swaged over, as shown at 25, against the outer surface of the barrel. The lower end of the cylindrical portion 23 of the pin is provided with an annular shoulder 26 which is located in a plane at an acute angle to the horizontal and the metal of the barrel at the periphery of the opening 21 rests upon this shoulder. It will be noted that a portion of the shoulder, as shown at 27, is indented adjacent the inner end of the flattened portion 16 of the barrel, so that the barrel at this point will form a neat fit with the shoulder 26. The swaging of the outer end of the cylindrical portion 23 securely fastens the pin to the barrel.

The projecting portion 30 of the pin, tapered as shown at 31 is adapted to be received within a passage 32 formed in a plank 33 of a wharf 34. The opening or passage 32 may be tapered if desired.

The rod holder is well adapted for use in the usual row boat since several of these holders may be employed with the projecting portion 30 of the pin 22 being received by the usual oar lock openings in the boat. By such use of the holders it is possible for a single person to use the row boat and have several rods trolling from the boat at the same time. Since the projecting portion 30 of the passage 32 is merely inserted within the openings in the plank of a dock or in the receptacles for the oar locks in a row boat the holder may swing on its pivot pin 22 and follow the line attached to the rod where the current tends to pull the line in a definite direction.

Due to the fact that the barrel 10 is located at the proper angle to the horizontal the end of the pole 13 cannot be readily withdrawn from the holder since the pull on the rod is usually in a downward manner so that sufficient friction is created between the end of the pole and the inner surface of the barrel to prevent ready release of the pole from the holder.

I claim:

A fishing rod holder comprising a barrel formed of metal, one end of the barrel adapted to receive the inner end of a fishing rod, the opposite end of the barrel having a transverse passage inclined at an acute angle to the longitudinal axis of the barrel, a pin having a cylindrical portion received by the passage, an expanded portion forming with the cylindrical portion an annular shoulder located in a plane which is at an acute angle to the longitudinal axis of the pin, the expanded portion of the pin gradually tapering towards one end of the pin, the cylindrical portion, the expanded portion and the tapering portion of the pin being formed as a unit, the other end of the barrel adjacent the cylindrical portion of the pin and at the underface of said barrel being flattened and turned inwardly toward the axis of the barrel so that the walls of the transverse passage will neatly fit the cylindrical portion of the pin.

ED A. RAITHEL.